United States Patent Office 3,453,218
Patented July 1, 1969

3,453,218
MOLYBDENUM-CONTAINING EPOXIDATION CATALYST AND METHOD OF MAKING SAME
Ming Nan Sheng, Cherry Hill, N.J., and John G. Zajacek, St. Davids, Pa., assignors to Atlantic Richfield Company, Philadelphia, Pa., a corporation of Pennsylvania
No Drawing. Filed June 9, 1966, Ser. No. 556,277
Int. Cl. B01j 11/00
U.S. Cl. 252—431                    5 Claims

ABSTRACT OF THE DISCLOSURE

Molybdenum metal is reacted with a combination of tertiary butyl hydroperoxide and formic acid at a temperature of from 10° C. to 50° C. to produce a catalyst for use in the epoxidation of olefins.

---

This invention relates to a molybdenum-containing catalyst useful as an epoxidation catalyst and to the method for producing such catalyst. More particularly it relates to a molybdenum-containing catalyst produced from metallic molybdenum.

It has been found that molybdenum-containing catalysts can be utilized to give high yields of epoxides in the liquid phase oxidation of olefins or olefinic compounds utilizing an organic hydroperoxide as the oxidizing agent. Molybdenum hexacarbonyl is representative of such molybdenum-containing catalysts, however, these compounds are exceedingly expensive and based on their molybdenum content, have a cost several times that of metallic molybdenum.

It now has been found that a molybdenum-containing epoxidation catalyst can be produced from metallic molybdenum. Moreover, this novel catalyst is made from relatively inexpensive reagents and since the process is carried out at low temperatures it is also safe.

It is an object of this invention, therefore, to provide a novel molybdenum-containing catalyst useful for the epoxidation of olefins.

It is a further object of this invention to provide a method of making a novel molybdenum-containing catalyst from metallic molybdenum using mild reaction conditions.

Other objects of the invention will be readily apparent from the following description of the invention and from the claims.

In accordance with this invention metallic molybdenum is reacted with a combination of formic acid and tertiary butyl hydroperoxide at temperatures in the range of from 10° C. to 50° C. The molybdenum-containing catalyst thus produced is useful in the epoxidation of olefins.

The metallic molybdenum may be in any physical form such as sheet, foil, lumps, rods or powder. The reaction product is in the form of a yellow solution and, when sufficient reaction has occurred, the solution becomes saturated and a yellow powder precipitates. In the examples which follow, sheet molybdenum was employed since the solution and the yellow powder separates or can be separated more readily from the molybdenum sheet than from the other forms of metallic molybdenum. Thus since the solution and the undissolved yellow powder can be separated it is easier to make quantitative measurements of the amount of the product which is obtained under various reaction conditions.

In the commercial production of the instant catalyst, molybdenum metal in the form of a powder is preferable since the higher surface area per unit weight of molybdenum promotes faster reaction. It has been found when molybdenum powder is utilized that small amounts of molybdenum in the center of a powder granule may remain unreacted and although this does not affect the activity of the final catalyst produced in accordance with this invention it is difficult to separate the yellow powder from the powdered molybdenum completely and thus quantitative measurements of the catalyst produced are subject to error. In producing the commercial catalyst it is preferable to continue the reaction until substantially all of the molybdenum has reacted in order to utilize the full economies of the process, however, small amounts of molybdenum may remain unreacted without affecting the activity of the catalyst. The catalysts produced from the various physical forms of the molybdenum are, of course, identical.

It is unnecessary to employ highly purified tertiary butyl hydroperoxide since the commercial grade material, i.e. 95 percent purity, has been found to be completely suitable and in the examples which follow the commercial material was employed. The formic acid employed is the commercial grade which has only trace amounts of impurities.

The reaction is carried out at atmospheric pressure and preferably at ambient temperatures, however, the temperature may range between 10° C. and 50° C. Temperatures above 50° C. are not preferable since the hydroperoxide tends to decompose rather rapidly. Temperatures below about 10° C. although they may be utilized are not preferred since the speed of the reaction is too slow to be useful. As has been stated the speed of the reaction is also influenced by the form of the metallic molybdenum. If sheet molybdenum is employed reaction times of 1 to 7 days are required to produce the same quantity of catalyst which is produced in one or two hours from powdered molybdenum. If powdered molybdenum is employed after a reaction time of several hours, i.e. 6 to 12, substantially all of the molybdenum is converted into the catalytic material.

The following examples are provided for the purpose of illustrating the invention and the preferred methods of carrying out the invention. It will be understood, however, that departures from the exact procedures as set forth in these examples will be apparent to those skilled in the art and accordingly these examples are not to be construed as limiting the invention thereto.

EXAMPLE I

Numerous runs were carried out utilizing various amounts of formic acid and tertiary butyl hydroperoxide for various reaction times at ambient temperatures, i.e. from 22° C. to 25° C., under atmospheric pressure without stirring. Pieces of molybdenum were cut from molybdenum sheet which was approximately 0.002 inch thick. In all of the runs in the following examples wherein sheet molybdenum was employed sheet of about this same thickness was used. The weight ratio of the combined weights of the formic acid and t-butyl hydroperoxide to the weight of the molybdenum was approximately 140:1. The weight percent of molybdenum converted to catalyst both in the solution and in the precipitate, when precipitate forms, is shown for each run in Table I.

TABLE I

| Ratio of wt. formic acid to wt. t-butyl hydroperoxide | Wt. percent Mo converted in reaction time (hours) of— | | |
|---|---|---|---|
| | 26 | 50.5 | 168 |
| 20:2 | 18.4 | 32.7 | 50.5 |
| 18:4 | 24.4 | 34.0 | 71.8 |
| 16:6 | 26.8 | 45.3 | [1] 100.0 |
| 14:8 | 25.3 | 51.8 | [1] 100.0 |
| 12:10 | 20.0 | 47.0 | [1] 100.0 |
| 10:12 | 14.2 | 34.2 | [1] 100.0 |
| 8:14 | 2.4 | 16.2 | 86.1 |
| 6:16 | 0 | 8.5 | 71.5 |
| 4:18 | 0 | 0.2 | 10.0 |
| 2:20 | 0 | 0.2 | 0.3 |

[1] 144 hours reaction time.

It will be seen from these data that longer reaction times give larger amounts of the catalyst, and that there is an optimum weight ratio of formic acid to teritiary butyl hydroperoxide of about 18:4 to 10:12.

EXAMPLE II

In another series of runs much higher ratios of formic acid to tertiary butyl hydroperoxide were employed under the same conditions as in Example I. The ratio of the combined weights of the formic acid and the tertiary butyl hydroperoxide to the weight of the molybdenum metal sheet was between 225:1 to 230:1. The weight percent of molybdenum converted to catalyst is shown in Table II.

TABLE II

| Ratio of wt. of formic acid to wt. of t-butyl hydroperoxide | Wt. percent Mo converted in reaction time (hrs.) of— | |
| --- | --- | --- |
| | 24 | 66.5 |
| 200:1 | 2.1 | [1] 16.9 |
| 100:1 | 6.3 | 15.1 |
| 50:1 | 15.2 | 37.3 |

[1] 69.5 hours reaction time.

These data when compared with the data for the runs in Example I show that very high ratios of formic acid to tertiary butyl hydroperoxide may be employed but that longer reaction times are required to give good conversions of the molybdenum metal to the molybdenum-containing catalyst.

EXAMPLE III

In order to demonstrate that molybdenum powder can be employed instead of the sheet, several runs were carried out with the molybdenum in the form of a finely divided powder. The weight ratio of the combined weights of the formic acid and the tertiary butyl hydroperoxide to the weight of the molybdenum was approximately twice that of Example II and the same weight ratios of formic acid to tertiary butyl hydroperoxide were the same as in Example II. The results are shown in Table III.

TABLE III

| Ratio of weight of formic acid to weight of tertiary-butyl hydroperoxide: | Weight percent molybdenum converted in 20 hours |
| --- | --- |
| 200:1 | 31.4 |
| 100:1 | 62.8 |
| 50:1 | 100.0 |

These results show that powdered molybdenum reacts far more rapidly than the sheet molybdenum.

EXAMPLE IV

A run was carried out at 50° C. utilizing a weight ratio of formic acid to tertiary butyl hydroperoxide of 200:1 with a weight ratio of the combined weights of the formic acid and tertiary butyl hydroperoxide to the weight of the molybdenum metal the same as in Example II. In 22.5 hours reaction time 11.1 weight percent of the molybdenum was converted to the catalyst, i.e. about a fivefold increase over the amount converted at ambient temperatures as shown in Example II.

EXAMPLE V

A run was carried out substituting acetic acid for formic acid. The weight ratio of the acetic acid to the tertiary butyl hydroperoxide was 20:1 and the weight ratio of the combined weights of acetic acid and tertiary butyl hydroperoxide to the weight of the molybdenum powder was about 500:1. The mixture was allowed to stand for 64.5 hours at ambient temperature. At the end of this time only a trace of molybdenum was found in the solution showing the reaction to be specific to formic acid.

EXAMPLE VI

A run was carried out with no formic acid present and a weight ratio of tertiary butyl hydroperoxide to molybdenum metal (sheet form) of 25:1. After standing at ambient temperature for 115 hours only an exceedingly minute amount of molybdenum could be detected in the solution showing the necessity of utilizing formic acid in the process.

A second run was carried out with no tertiary butyl hydroperoxide being employed. The weight ratio of the formic acid to the molybdenum sheet was approximately 250:1. The run was carried out for 69½ hours at ambient temperature but no molybdenum was found to be dissolved. This experiment demonstrated that tertiary butyl hydroperoxide is a necessary component of the reaction mixture.

From the foregoing examples and from additional experiments it has been found that there should be sufficient tertiary butyl hydroperoxide in the reaction mixture to maintain an oxidizing condition. Although large excesses of formic acid and tertiary butyl hydroperoxide were employed in many of the runs of the examples, in general, two moles of tertiary butyl hydroperoxide per mole of molybdenum metal is sufficient to maintain the desired oxidizing condition. Likewise it has been found that the amount of formic acid of about two moles per mole of molybdenum metal is sufficient to produce good yields of the catalyst. Expressed in weight ratios as has been used herein the minimum weight ratio for the tertiary butyl hydroperoxide to molybdenum metal is about 2:1 and the formic acid to molybdenum is about 1:1 or the weight ratio of the combined weights of the tertiary butyl hydroperoxide and the formic acid to the weight of the molybdenum is about 3:1. Somewhat better results are obtained when the weights of the formic acid and the tertiary butyl hydroperoxide are about equal, although the formic acid can be in excess as shown in Example I. The catalysts made in accordance with the foregoing examples have been found to be effective olefin epoxidation catalysts.

A sample of the yellow solids obtained in Examples I and II were separated from the formic acid and tertiary butyl hydroperoxide mixture by filtration. These solids were found to be soluble in water and hot methanol but only slightly soluble in cold methanol and in tertiary butyl alcohol.

Another sample of these solids was dissolved in hot methanol, the amount of yellow solids being approximately 3.33 grams/100 ml. of hot methanol. To this solution, tertiary butyl hydroperoxide, tertiary butyl alcohol and propylene were added with stirring. The quantity of tertiary butyl hydroperoxide was 833 grams/100 ml. of the catalyst solution, the amount of tertiary butyl alcohol was approximately 4900 grams per 100 ml. of the catalyst solution and the propylene was approximately 1665 grams/100 ml. of the catalyst solution. The reaction mixture was heated to 110° C. and held at this temperature for 1 hour. A conversion of 71.7 weight percent of the tertiary butyl hydroperoxide was obtained and an 84.8 weight percent yield of epoxide based on tertiary butyl hydroperoxide converted was obtained. This example demonstrates that the molybdenum-containing product prepared in accordance with this invention is an extremely useful catalyst for the epoxidation of olefins.

Other runs have also demonstrated that the catalyst made by reacting the molybdenum metal with the combination of formic acid and tertiary butyl hydroperoxide is an effective olefin epoxidation catalyst.

We claim:
1. A method of making a molybdenum-containing catalyst useful as an epoxidation catalyst which comprises reacting molybdenum metal with a combination of tertiary butyl hydroperoxide and formic acid at a temperature in the range of from 10° C. to 50° C.

2. The method according to claim 1 wherein the reaction temperature is ambient temperature.

3. The method according to claim 1 wherein the weight ratio of the formic acid to the tertiary butyl hydroperoxide is in the range of about 18:4 to 10:12.

4. The method according to claim 1 wherein the weight ratio of the combined weights of tertiary butyl hydroperoxide and formic acid to the weight of molybdenum is in the range of from about 3:1 to 500:1.

5. The catalyst prepared in accordance with the method in claim 1.

References Cited

UNITED STATES PATENTS 3,351,635  11/1967  Kollar _____ 260—348.5
2,613,223  10/1952  Young _____ 260—535

PATRICK P. GARVIN, *Primary Examiner.*

U.S. Cl. X.R.

260—348.5